United States Patent Office 3,362,413
Patented Jan. 9, 1968

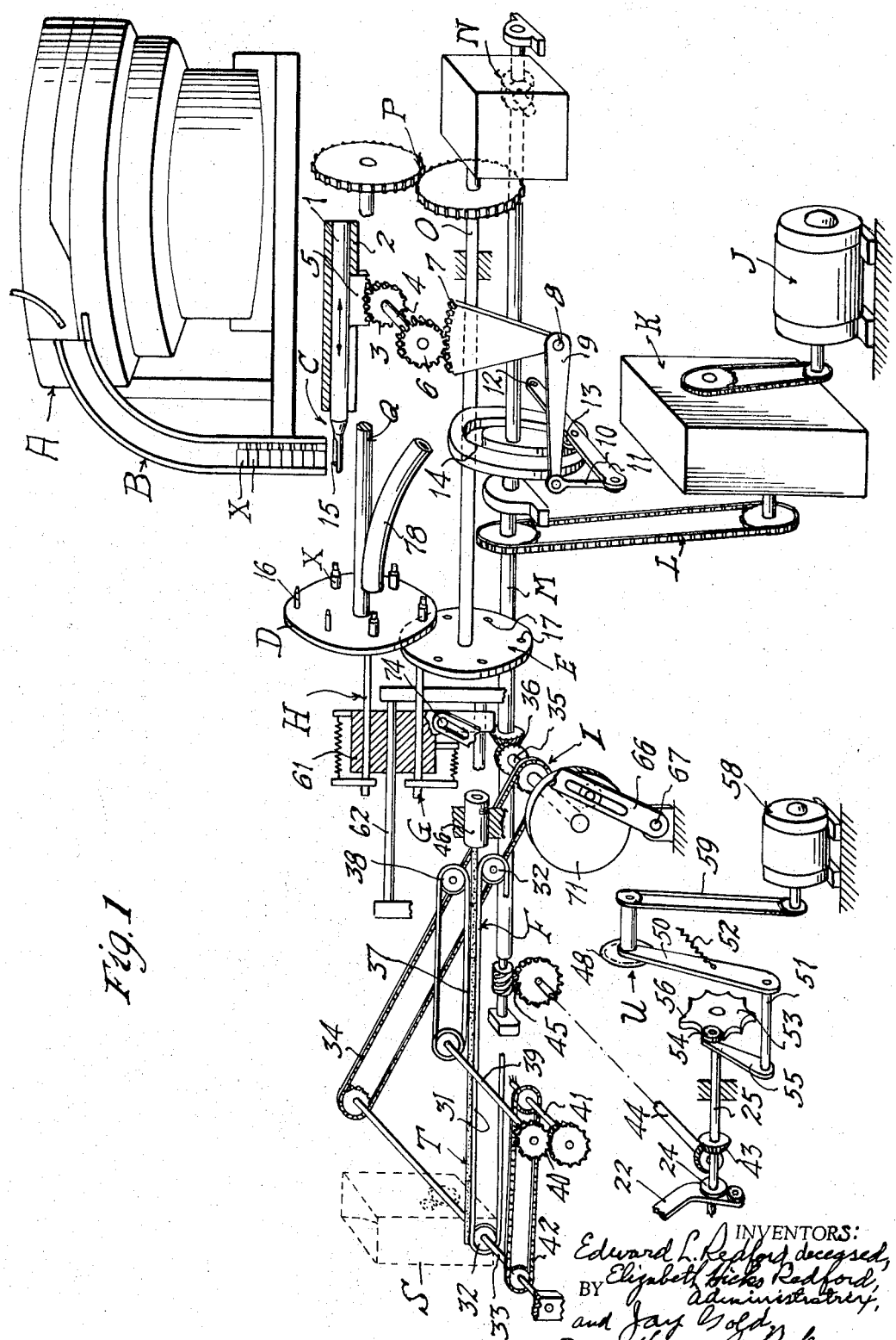

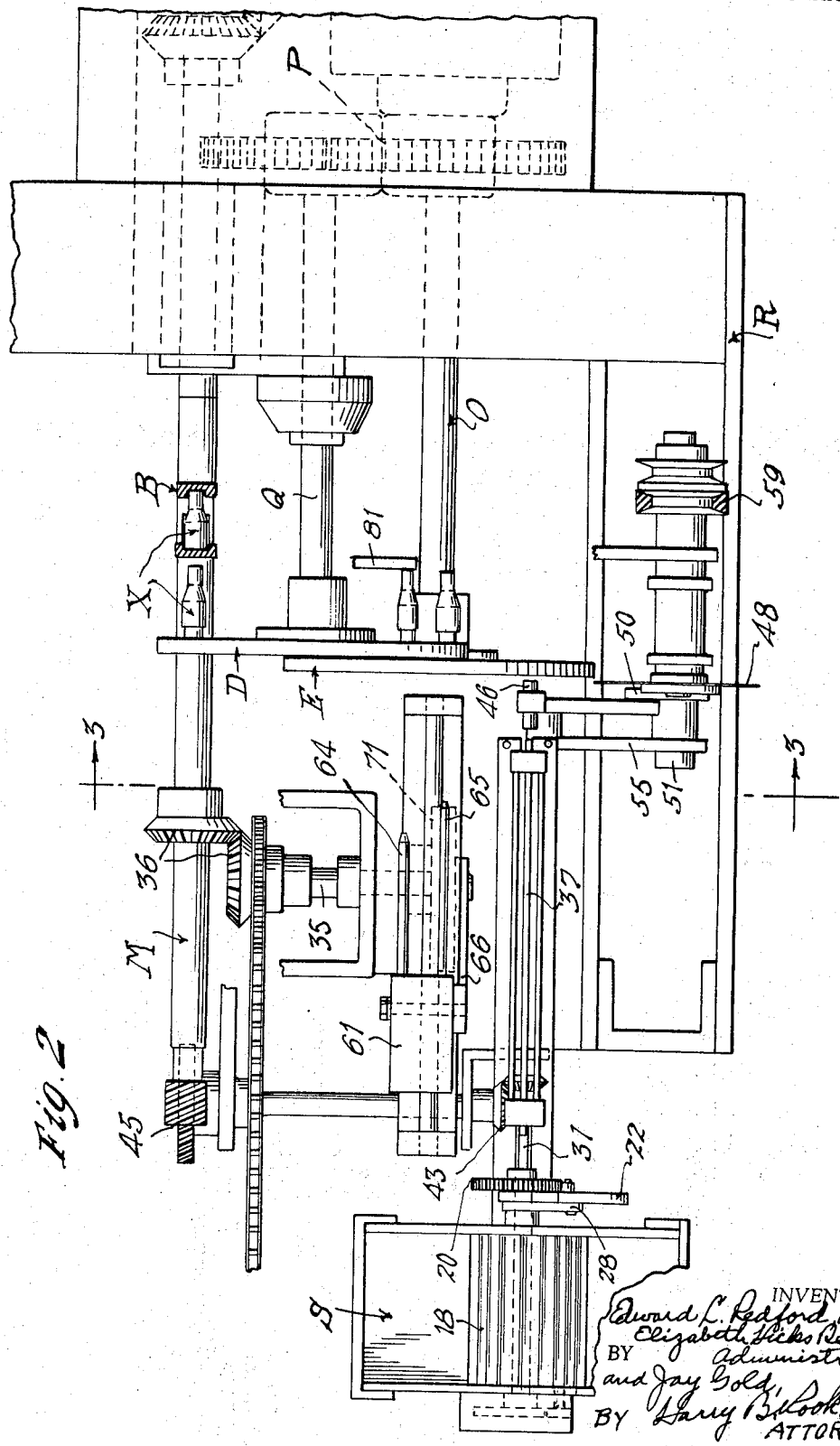

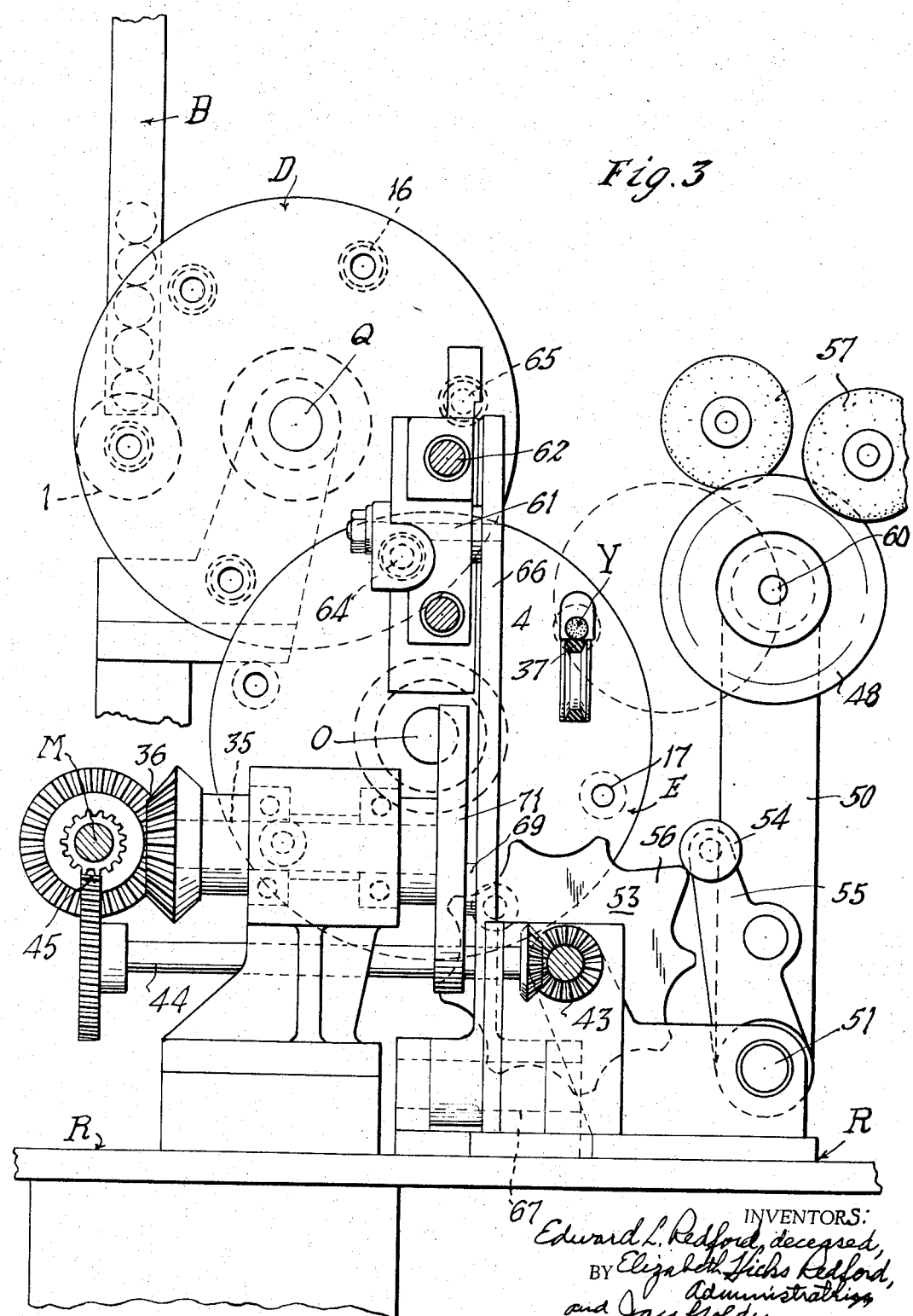

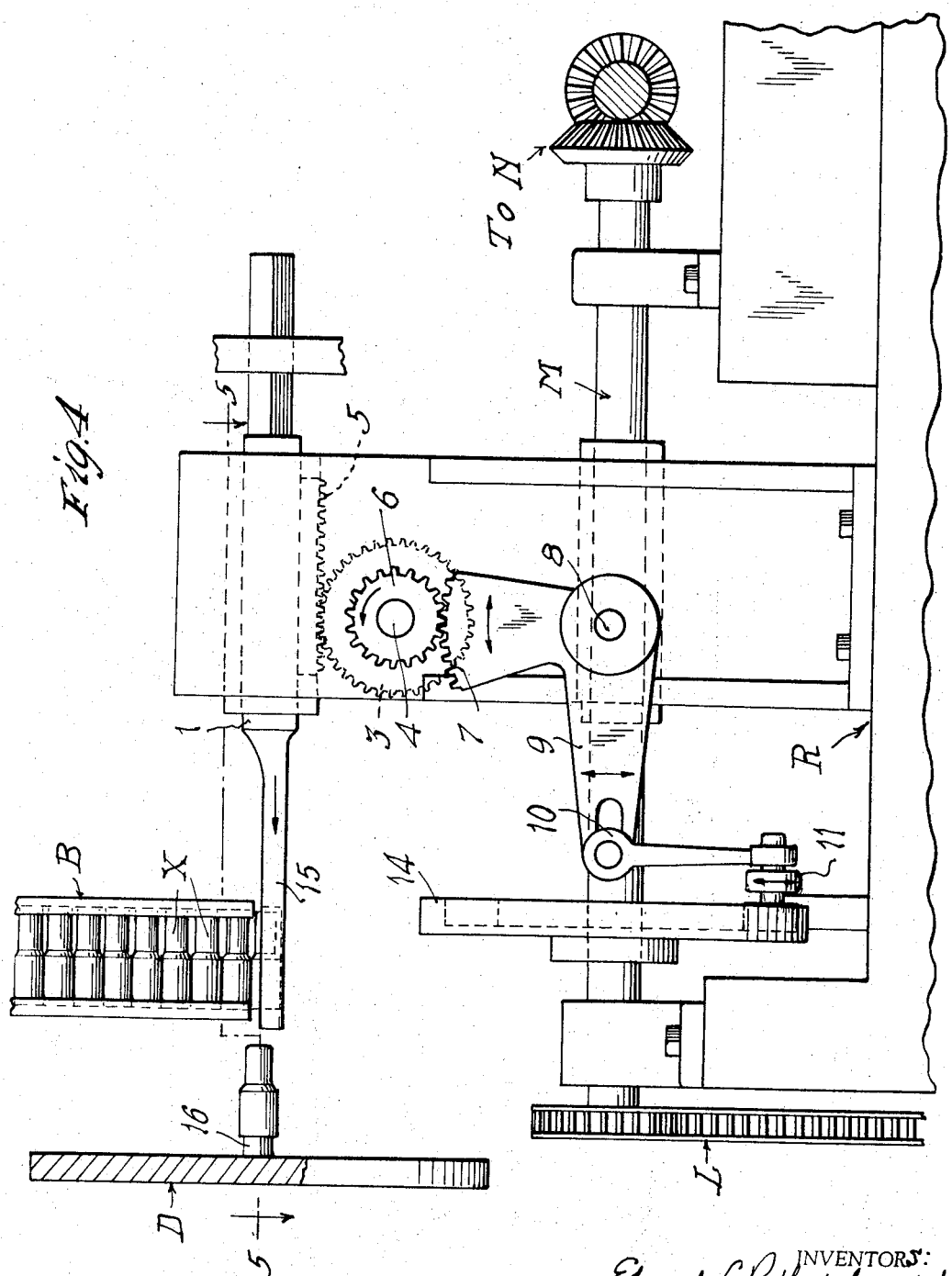

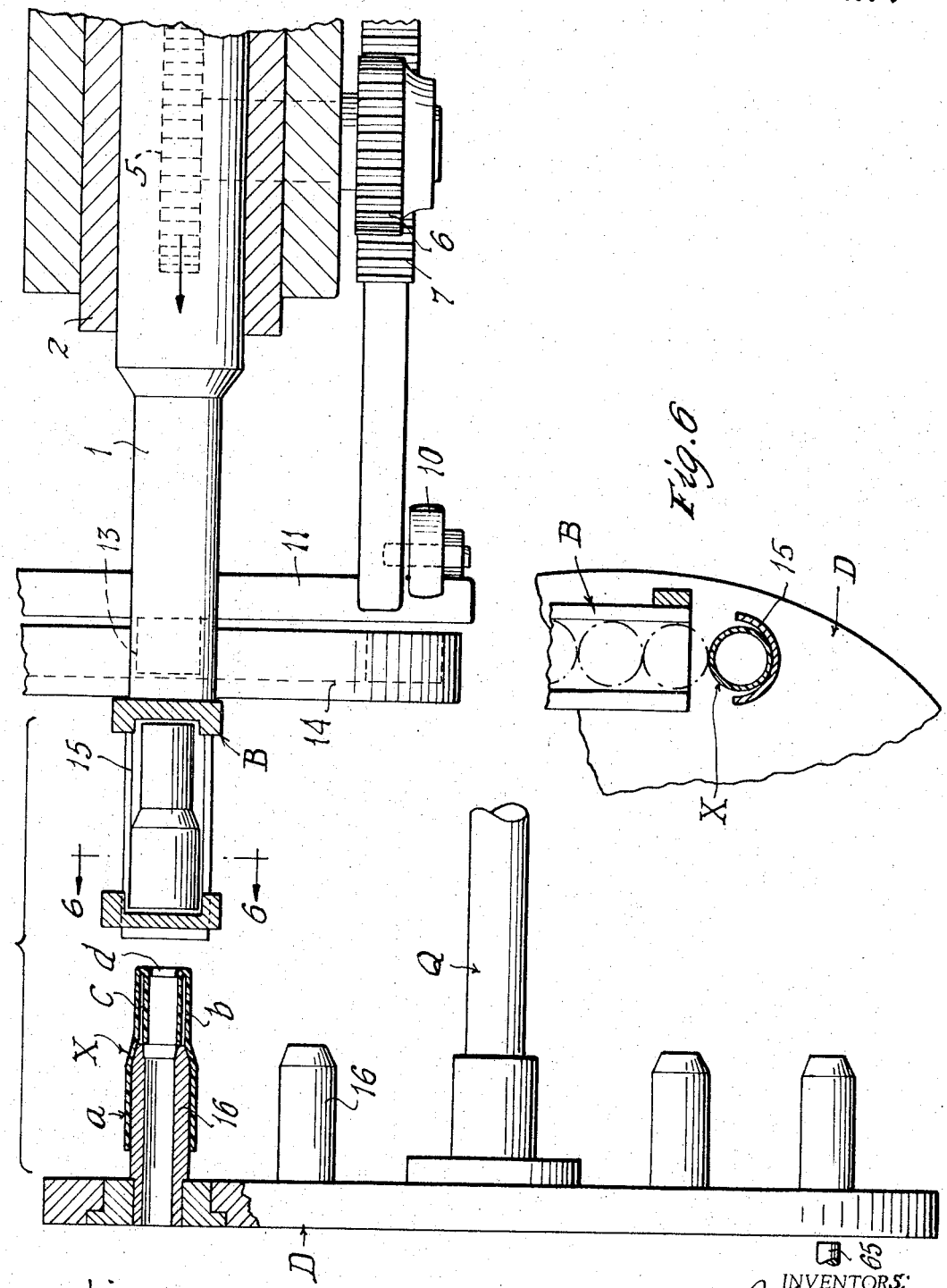

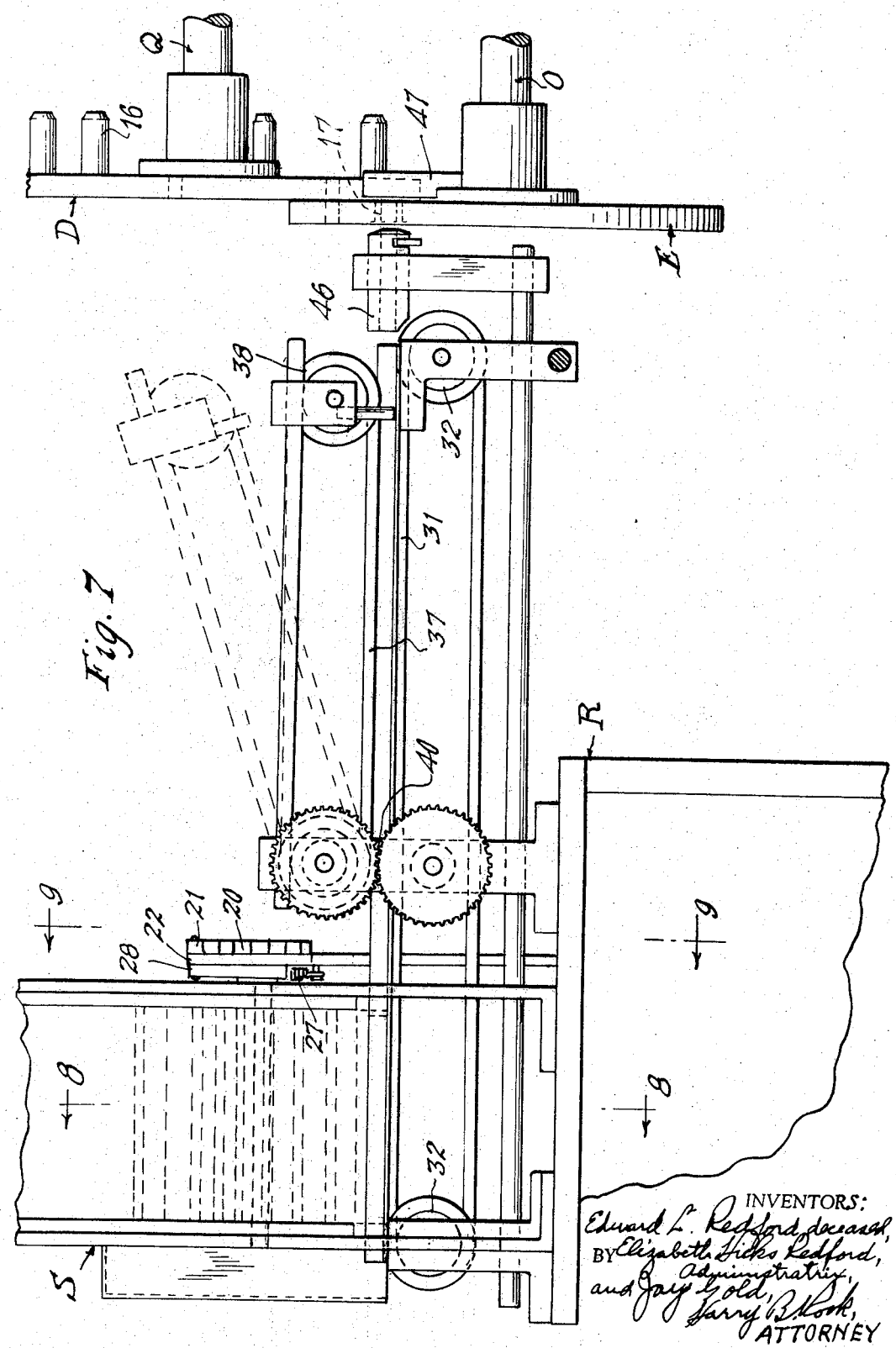

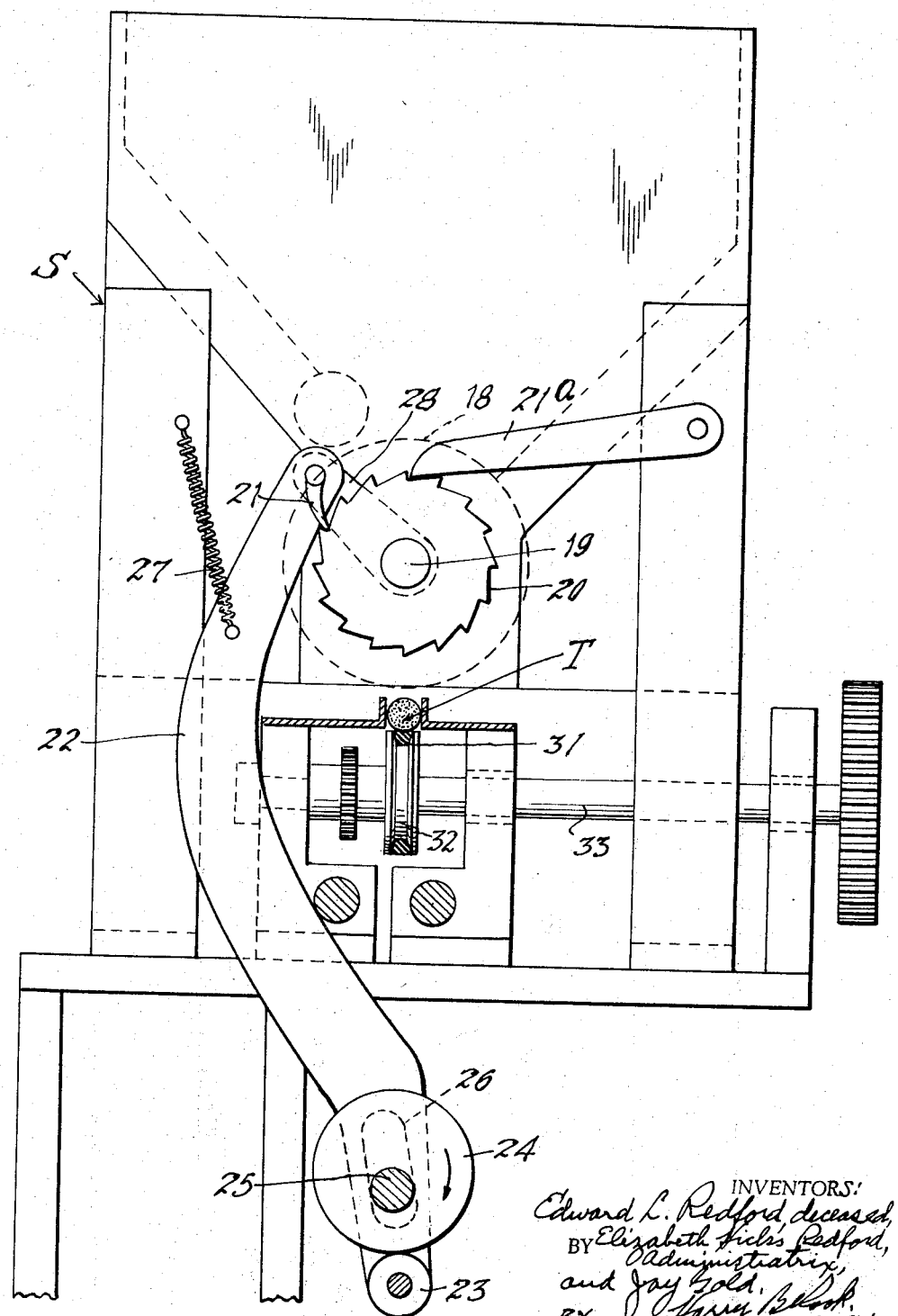

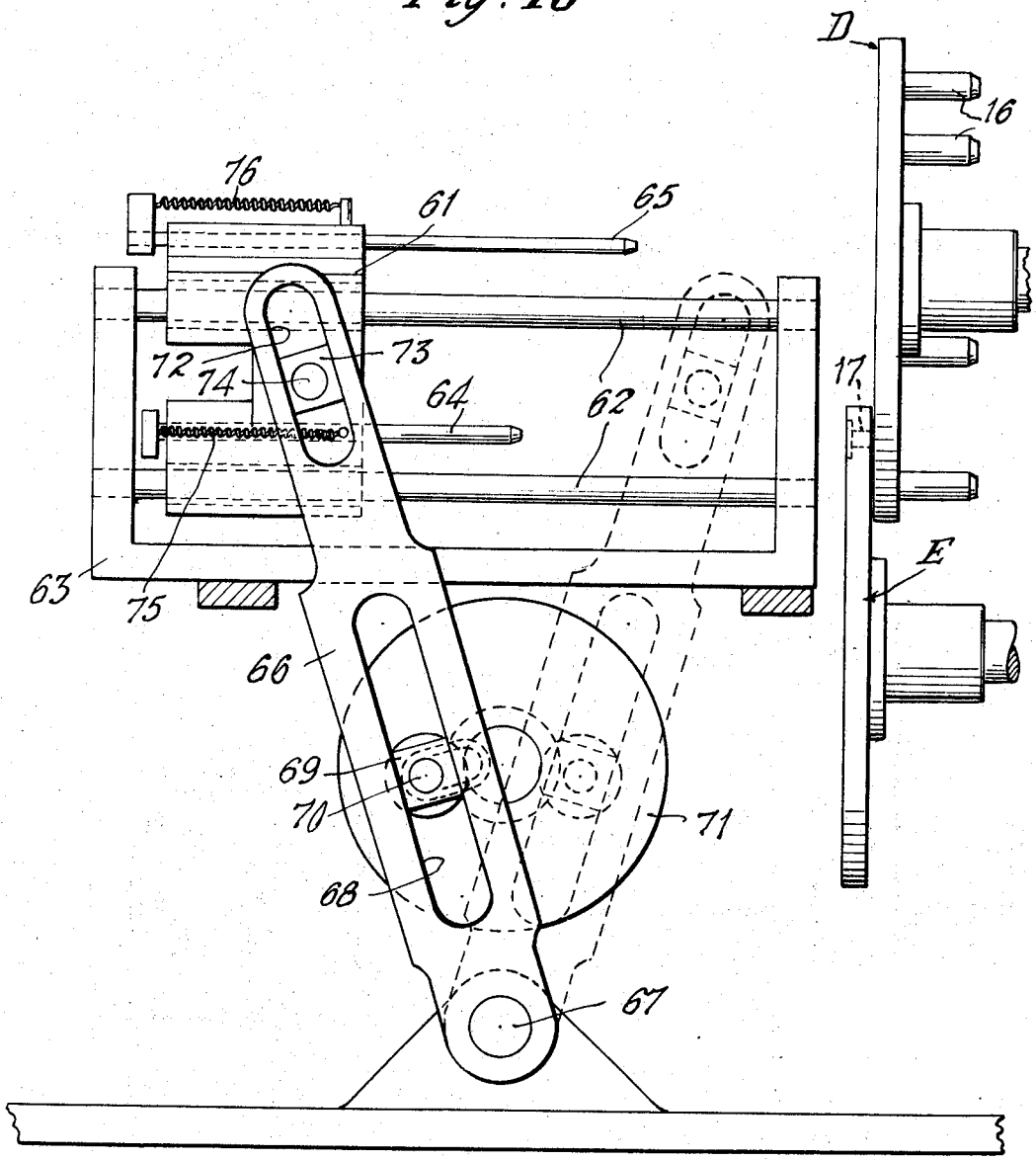

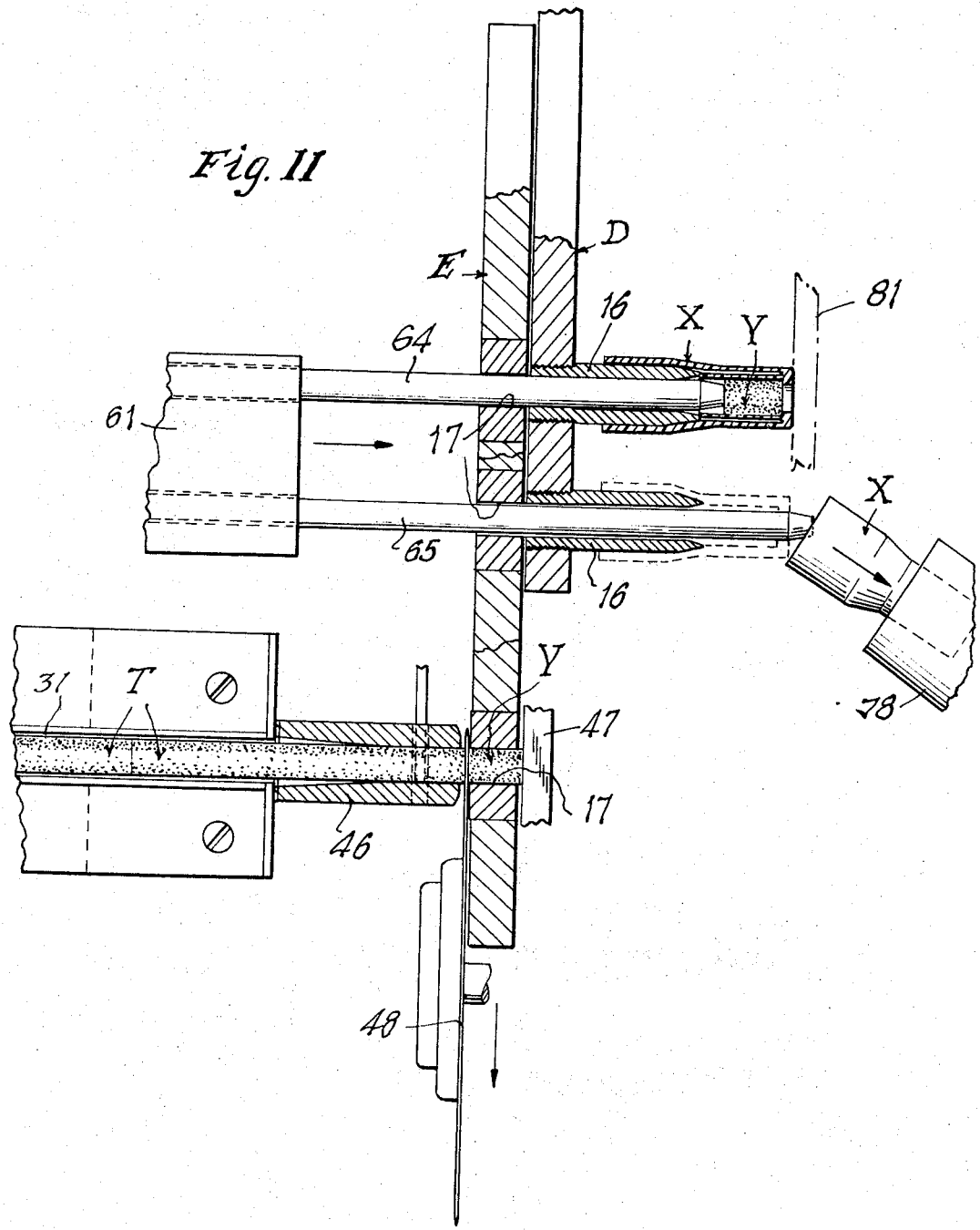

3,362,413
MACHINE FOR INSERTING FILTER ELEMENTS INTO CIGAR HOLDERS
Edward L. Redford, deceased, late of Elizabeth, N.J., by Elizabeth Hicks Redford, administratrix, Elizabeth, N.J., and Jay Gold, Watchung, N.J., assignors to Belgo International, Watchung, N.J., a partnership
Filed Mar. 29, 1966, Ser. No. 539,258
6 Claims. (Cl. 131—94)

This invention relates in general to a machine for inserting small cylindrical elements into preformed hollow cylindrical tubes, and more particularly the invention contemplates a machine for inserting filter elements into cigar or cigarette holders or tips of the type shown in Patent No. 3,204,643 dated Sept. 7, 1965.

In general, the invention contemplates a machine wherein the preformed tubular cigar or cigarette tips or holders are fed in succession, and conveyed to and mounted on a tubular spindle and while the tips are so held, a filter element of predetermined size is inserted into each tip, after which the assembled tips and filter elements are discharged from the machine.

One object of this invention is to provide a machine of this character which embodies a novel and improved construction and combination of mechanism for arranging and holding the plastic cigar or cigarette tip or holder and the filter element in proper juxtaposition or relation to each other for the insertion of the filter element into the tip, and means for inserting the filter elements into the tips in rapid succession.

Another object is to provide such a machine which includes novel and improved means for feeding from a source of supply a continuous rod or rope-like piece, severing the rod or rope-like piece into individual filter elements, and conveying the individual elements to a mechanism for inserting the individual elements into individual cigarette tips.

Other objects, advantages and results of the invention will be brought out in conjunction with the following drawings in which:

FIGURE 1 is an exploded schematic elevation of the machine with parts displaced from their normal relation with the other parts for clearness in illustration;

FIGURE 2 is a top plan view of the machine with portions omitted for clearness of illustration;

FIGURE 3 is an enlarged transverse, vertical, sectional view approximately on the plane of the line 3—3 of FIGURE 2;

FIGURE 4 is an enlarged fragmentary elevation of the mechanism for feeding the cigar or cigarette tips from a hopper to a holder turret;

FIGURE 5 is an enlarged horizontal, sectional view approximately on the plane of the line 5—5 of FIGURE 4;

FIGURE 6 is a fragmentary, transverse, sectional view on the plane of the line 6—6 of FIGURE 6;

FIGURE 7 is an enlarged side elevational view of the mechanism for feeding the filter elements;

FIGURE 9 is an enlarged transverse, vertical, sectional view through the machine, approximately on the plane of the line 9—9 of FIGURE 7 and showing parts that are not illustrated in FIGURE 7;

Figure 8:
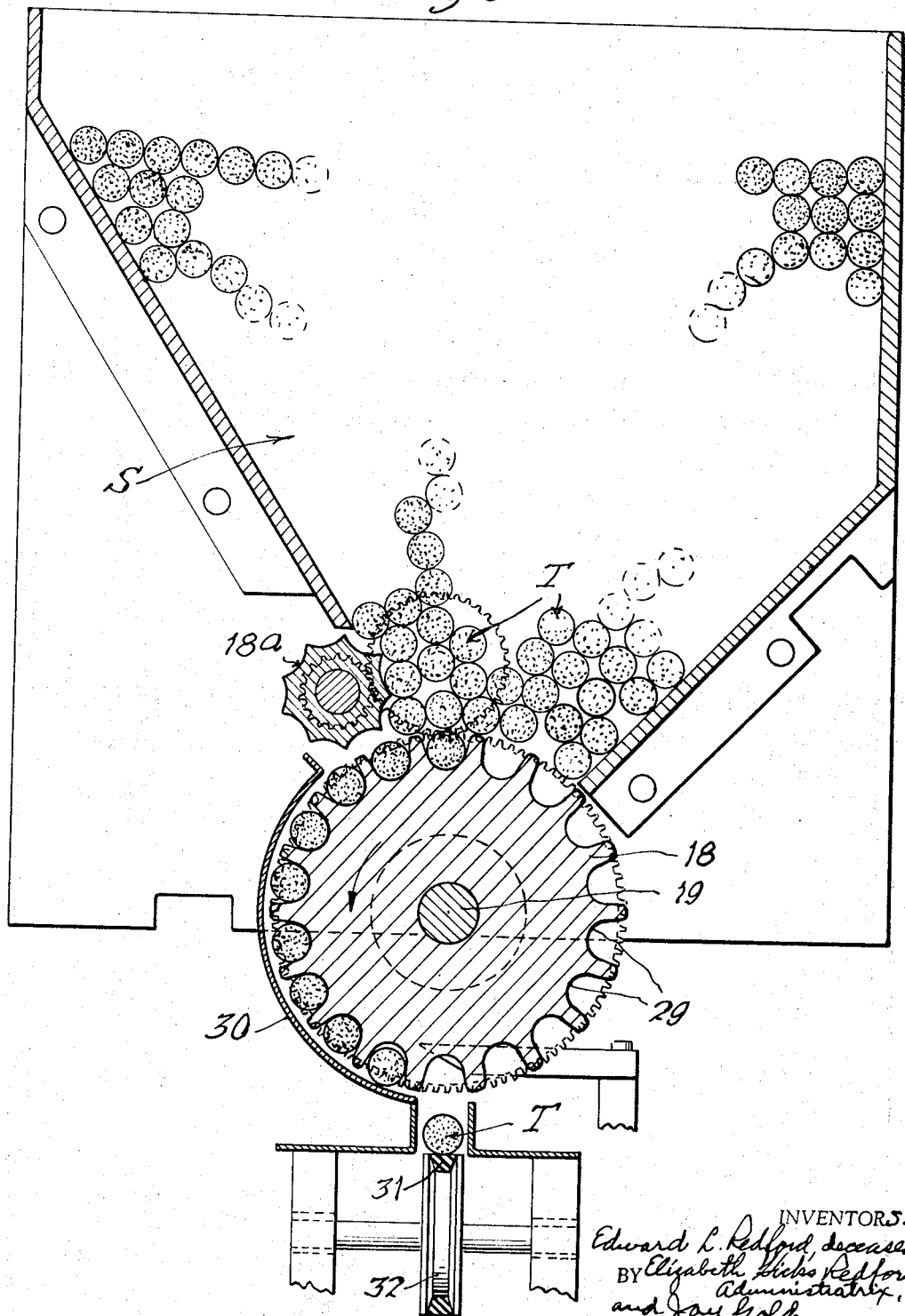
FIGURE 8 is an enlarged, transverse, sectional view approximately on the plane of the line 8—8 of FIGURE 7.

FIGURE 10 is an enlarged fragmentary side elevational view of the mechansim for inserting the filter elements into the plastic cigar or cigarette tips and for ejecting the assembled tip and filter element showing the parts in normal or at rest position, and FIGURE 11 is a further enlarged, combined sectional and top plan view of portions of the filter element feeding mechanism, the filter element inserting and injecting mechanism and the turret cigar or cigarette tip holder.

Specifically describing the embodiment of the invention and with particular reference to FIGURE 1 of the drawings, the reference character A designates a hopper of known type in which the preformed plastic cigar or cigarette tips X are placed and agitated and guided into file formation and led into a discharge chute B from which they are received by a reciprocating conveyor mechanism generally designated C and fed to a turret cigar or cigarette tip holder D by which the tips are moved step-by-step into proper relation to a turret filter element carrier disc E to which the filter elements Y are fed by mechanism generally designated F and from which the filter elements are pushed or inserted by mechansim generally designated G into the cigar or cigarette tips while the latter are supported on the turret holder D to complete the combination of the tip and filter element, which combination is ejected from the turret holder D by mechanism generally designated H which preferably is actuated simultaneously with and by the same driving device which is generally designated I.

All of the parts are shown as driven from a common power source consisting of an electric motor J which is connected to a variable speed reducing apparatus K the output shaft of which has a chain and sprocket connection L with a main shaft M which is connected through indexing gearing N of known type to a counter shaft O on which is mounted and driven thereby the turret filter element carrier disc E. The shaft O has a geared connection P with a second counter shaft Q which drives the turret cigarette tip holder disc D which is rigidly mounted on the shaft. It will be understood by those skilled in the art that these shafts are mounted in bearings in a machine frame that is generally designated R, and that the shafts O and Q and the turret discs D and E are rotated intermittently in timed relation to bring the tips X and the filter elements into proper relation to each other for the transfer of the filter elements from the disc E into the tips on the disc D.

As hereinbefore indicated, the filter elements are initially supplied from a hopper designated S in the form of rods or rope-like pieces T, and these pieces are cut into filter elements of predetermined length by a cutting mechanism generally designated U.

More specifically describing the invention, the cigar or cigarette tip X as best illustrated in FIGURES 5 and 11 comprises a molded tubular cylindrical body portion $a$ and a mouthpiece or bit $b$ at one end thereof within which is an integral hollow boss $c$ that extends into the mouthpiece with one end opening into the body portion $a$ and terminating short of the outer end thereof and the other end communicating with a draft opening $d$. The body portion $a$ has an internal diameter such as to snugly frictionally receive the end of a cigar or cigarette, and the hollow boss $c$ has an interior diameter to snugly frictionally receive the filter element Y.

The reciprocating conveyor mechanism C comprises a rod 1 slidably mounted in a guide 2 on the frame R and shown as reciprocated by a pinion 3 that is mounted on a shaft 4 and meshes with a rack bar 5 on the rod 1, the shaft 4 having thereon another pinion 6 meshing with a gear quadrant 7 pivoted at 8 and rigidly connected to an arm 9 which is connected by a link 10 to a lever 11 which is pivotally mounted on the frame as at 12 and has mounted thereon a follower roller 13 which follows a box cam 14 that is mounted on and rotated by the shaft M. One end of the rod 1 has a pusher finger 15 formed with an upwardly facing seat 15a to receive and hold one of the tips X as it drops by gravity from the chute B as best shown in FIGURES 1, 4 and 5. During operation of the machine, the rod 1 is reciprocated so that the pusher finger is moved from the normal position shown in FIGURE 4 to the left in the direction of the arrow to convey the lowermost tip in the chute onto one of the spindles 16 on the turret tip holder D, the body portion of the tip slidably fitting over the end of the spindle as best shown in FIGURE 11. During this motion of the pusher finger, the other portion of the finger to the right of the seat 15a moves under the chute so as to prevent the tips from dropping out of the chute until the seat 15a has been brought again into its normal position beneath the chute.

The turret tip holder D has a plurality of equidistantly spaced spindles 16 and the turret is rotated step-by-step in timed relation to the reciprocation of the pusher finger 15 so that at the end of each step of movement one of the spindles is in axial alignment with the tip X that is held in the seat 15a. Each spindle 16 is tubular to permit the passage therethrough of one of the filter elements Y into the hollow boss c of the tip, as best shown in FIGURE 11. The turret filter element carrier E partially overlies the tip holder D in close juxtaposition thereto but spaced therefrom. The filter element carrier E has a plurality of transverse holes 17 therethrough in equidistantly spaced relation to each other and to the center of the carrier; and the carrier E is rotated step-by-step in timed relation to the holder D so that at the end of each step of movement, the opening through each of two of the spindles 16 is in axial alignment with an opening 17 in the carrier E. Thus, in accordance with the present embodiment of the invention, at the end of each step of movement of the two turrets D and E, a tip is applied to one spindle 16, a filter element is inserted into one of the holes 17 of the carrier and another filter element is ejected from another of said holes 17 into the boss c of another tip X, and a complete assembly of tip and filter element is ejected or forced off another spindle, as best illustrated in FIGURES 3 and 11.

Now referring to the supply of the filter elements, a plurality of rods or rope-like pieces T of suitable filter material are placed in the hopper S and are discharged or fed from said hopper one by one in timed relation to the hereinbefore described movements, and the rope-like pieces are fed longitudinally toward the carrier E, and severed into individual filter elements of the proper length which are inserted into the proper openings 17 of the carrier. Referring to FIGURES 2, 7, 8 and 9, the hopper has an outlet opening at its bottom which is bridged by a discharge control drum 18 carried by a shaft 19 that is rotatably mounted in the hopper and actuated by pawl and ratchet mechanism including a ratchet 20, a pawl 21 pivoted on a pawl lever 22 which carries at one end a follower roller 23 which follows a cam 24 on a shaft 25 that passes loosely through a slot 26 in the pawl lever which is normally influenced upwardly in FIGURE 9 by a spring 27 which holds the follower roller 23 in engagement with the cam 24. The upper end of the lever 22 is pivotally connected to a crank 28 which is rigidly connected to the drum shaft 19 so that upon rotation of the cam 24, the gravity-influenced pawl 21 is brought successively into engagement with the teeth of the ratchet so as to rotate the drum 18 step by step. A backstop pawl 18a is desirable.

The shaft 25 and cam 24 are shown as driven through beveled gearing 43 from a shaft 44 which is in turn driven through a worm and worm gear drive 45 from the shaft M. The drum has a plurality of equidistantly spaced longitudinal grooves 29 on its periphery each to receive one of the rods T that are moved along in succession along an apron 30 to the lower end of the apron where the rods fall by gravity onto a belt conveyor 31 which is mounted on pulleys 32 one of which is driven by a shaft 33 which is in turn driven by a chain and sprocket gearing 34 from a counter shaft 35 that forms a part of the driving device I and is connected by beveled gearing 36 to the drive shaft M. Desirably the rods T of filter material are more positively fed by coaction with belt 31 of auxiliary endless belt 37 mounted on pulleys 38 one of which is driven by a shaft 39 which is geared by gearing 40 to another shaft 41 which in turn is driven by chain and sprocket connection 32 with the shaft 33.

The rope-like pieces T are fed longitudinally through a guide throat 46 and into the opening 17 of the filter element carrier E that is in alignment with the piece T until the leading end of the piece abuts a filter stop 47, as shown in FIGURE 11.

Thereupon the filter element piece T is severed by a high speed rotating knife 48 to cut off between the knife and the stop 47 a filter element Y of the proper length. The knife is shown as mounted on a lever 50 pivotally mounted at one end at 51 on the frame and normally influenced toward the filter element piece by a string 52 (FIGURE 1). The knife supporting lever 50 is moved in the opposite direction away from the filter element piece by a notched cam wheel 53 that is followed by a roller 54 on an arm 55 rigidly connected to the shaft 51. The cam 53 moves the arm 50 in timed relation to the movement of the turrets D and E, and once in each complete revolution of the cam, a special elongated projection 56 moves the arm 50 into contact with two sharpening wheels 57 which keep the knife in keenly sharp condition. The knife is rotated at high speeds by an electric motor 58 through a belt and pulley connection 59 which is connected to the stub shaft 60 by which the knife is connected to the supporting lever 50.

After the filter element Y has been severed from the piece T, it is carried by the turret filter element carrier E into axial alignment with the opening through one of the spindles 16 on the turret tip holder D and while in this position, the filter element is pushed from the opening 17 in the carrier E through the juxtaposed spindle and into the hollow boss c of the cigarette tip that is mounted on said spindle, as shown at the upper portion of FIGURE 11 and in FIGURE 3; and simultaneously a cigarette tip having a filter element assembled therein is ejected or pushed from another spindle 16 as shown at the middle of FIGURE 11.

The means for inserting the filter element into the tips and for simultaneously ejecting an assembled tip and filter element from a spindle on the turret holder D, is shown as comprising a block 61 as slidably mounted for horizontal movement on guide rods 62 fixedly secured in a bracket 63 on the machine frame R. Slidably mounted in the block 61 is a filter element inserting push rod 64 and a tip and filter element assembly ejecting rod 65. These rods are spaced apart so that each thereof will be in axial alignment with one of the spindles 16 at the end of each step of movement of the holder D, as best shown in FIGURES 2, 3 and 10. The block 61 is reciprocated to move the rods 64 and 65 into the filter element inserting and tip and filter element assembly ejecting positions, by a lever 66 pivotally mounted at one end on the frame as indicated at 67 and having a longitudinal slot 68 in which is slidable an actuating block 69 which is pivotally connected to a pin 70 on a crank disc 71 carried by the shaft 35. The swinging end portion of the lever has another longitudinal slot 72 therein in which is slidably mounted another actuating block 73 which is pivotally connected by a pin 74 to slide block 61. With this construction, when the crank disc 71 is rotated, the lever 66 is oscillated so as to move the slide block 61 back and forth along the rods 62, all in timed relation to the rotation of the turrets D and E.

Preferably the rods 64 and 65 are spring biased by the respective springs 75 and 76 that are connected between the rear ends of the rods and studs on the block 61, as best shown in FIGURES 1 and 10.

Preferably the assembled tips and filter elements are ejected from the spindles 16 into a discharge chute 78, by which they may be conducted to a desired point, such as a machine for applying the tips to cigarettes or cigars or to a suitable receptacle.

It is desirable, also, to provide a suitable abutment plate for the end of the tip X as the filter element is inserted into the tip, such an abutment being shown in FIGURES 2 and 11 and designated 81.

It will be understood by those skilled in the art that while the now-preferred embodiment of the invention has been shown and described, the structural features of the machine may be modified and changed within the spirit and scope of the invention.

What is claimed is:

1. A machine for inserting filter elements into tubular cigar tips, comprising means for moving tubular spindles in predetermined spaced relation step-by-step successively to a tip feeding station and to a filter inserting station, means at said tip feeding station for feeding tubular tips and for applying one tip to each spindle in timed relation to movement of said spindle, filter feeding means for feeding filter elements in succession to said filter inserting station into register with said spindles and for inserting a filter element through each spindle into the tubular tip thereon in timed relation to the movement of the spindles to said filter inserting station, and means for supplying filter elements to said filter feeding means.

2. A machine as defined in claim 1 wherein the first-mentioned means includes a turret disc rotatable step-by-step having said spindles mounted thereon, the second-named means includes a feed chute for said tubular tips and a reciprocating pusher at the tip feeding station for pushing the tips singly from said chute onto the spindles, and the filter feeding means includes a carrier disc rotatable step-by-step and having openings to receive filter elements and to register in succession with the one of said tubular spindles that is at the filter-inserting station, and a reciprocating rod for pushing a filter element into the one of said spindles and the tip thereon that are in register with said opening in the carrier disc at the filter-inserting station, and the last-named means includes a conveyor for moving a rod of filter material longitudinally and to push one end of said rod into the one of said openings of the carrier disc that is disposed between the tip feeding station and the filter inserting station, and a knife for severing said rod adjacent said carrier disc to deposit a filter element in said opening of the carrier disc.

3. A machine as defined in claim 2 with the addition of a second reciprocating rod movable through one of said openings of the carrier disc and through the spindle in register with said opening that bears a completed assembly of a tip and a filter element for ejecting said assembly from said spindle.

4. A machine as defined in claim 1 wherein the last-named means includes a supply hopper for rods of filter material, a conveyor for moving said rods end to end longitudinally and for pushing the leading end of a rod into said filter feeding means, means for discharging said rods singly from said hopper to said conveyor, and a knife for severing the leading end portion of the leading rod to provide filter element in said filter feeding means.

5. A machine as defined in claim 4 wherein said knife is a rotating circular blade and with the addition of means mounting and moving said knife into and out of engagement with said rod of filter material in timed relation to the movement of said carrier disc, and means for rotating said knife at high speed.

6. A machine as defined in claim 1 wherein said filter feeding means includes a carrier disc rotatable step-by-step and having openings to receive filter elements in succession and to register in succession with the tubular spindle at the filter inserting station, a rod mounted on a reciprocating block for pushing a filter element from the opening at the filter inserting station through the spindle in register with said opening into the tip on said spindle, and a second rod mounted on said reciprocating block movable through one of said openings of the carrier disc and through the spindle in register with said opening that bears a completed assembly of a tip and a filter element for ejecting said assembly from said spindle, and means for reciprocating said block in timed relation to the movement of said carrier disc.

References Cited

UNITED STATES PATENTS

| | | | |
|---|---|---|---|
| 1,090,472 | 3/1914 | Gueniffet et al. | 131—94 |
| 1,830,446 | 11/1931 | Schunemann | 131—88 |
| 2,105,412 | 1/1938 | Edwards | 93—1 |
| 2,147,278 | 2/1939 | Ahne | 93—77 |
| 3,119,397 | 1/1964 | Molins et al. | 131—94 |
| 3,165,953 | 1/1965 | Brown et al. | 131—94 X |
| 3,199,515 | 8/1965 | Lowe et al. | 131—94 |

ALDRICH F. MEDBERY, *Primary Examiner.*